Figure 1:
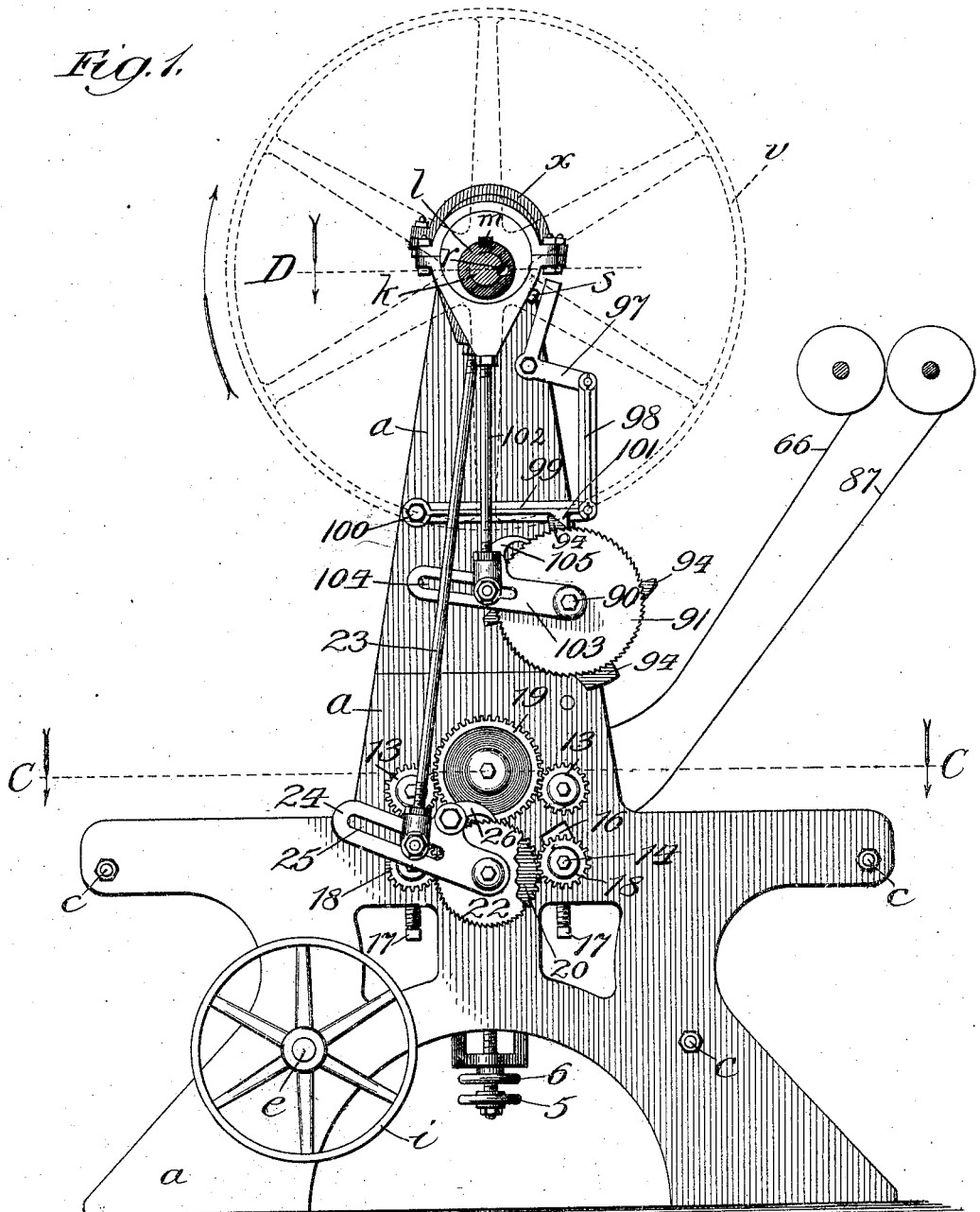

No. 775,622. PATENTED NOV. 22, 1904.
E. E. FLORA.
MACHINE FOR MAKING BOX BLANKS.
APPLICATION FILED APR. 7, 1904.
NO MODEL. 12 SHEETS—SHEET 5.

Witnesses:
Inventor:
Ellsworth E. Flora,
By Dyrenforth, Dyrenforth & Lee,
Attys.

No. 775,622. PATENTED NOV. 22, 1904.
E. E. FLORA.
MACHINE FOR MAKING BOX BLANKS.
APPLICATION FILED APR. 7, 1904.
NO MODEL. 12 SHEETS—SHEET 6.
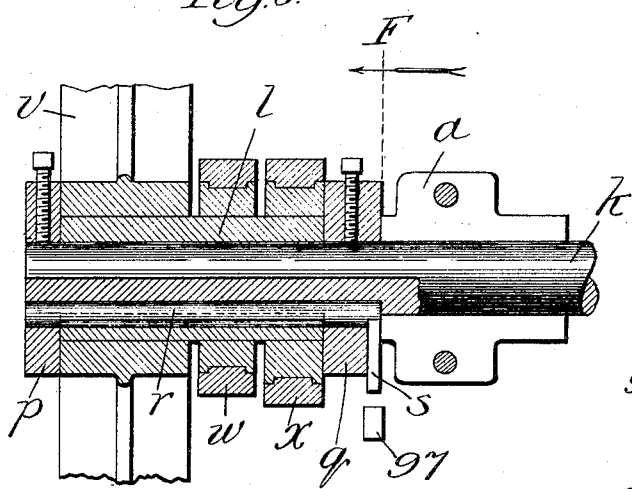
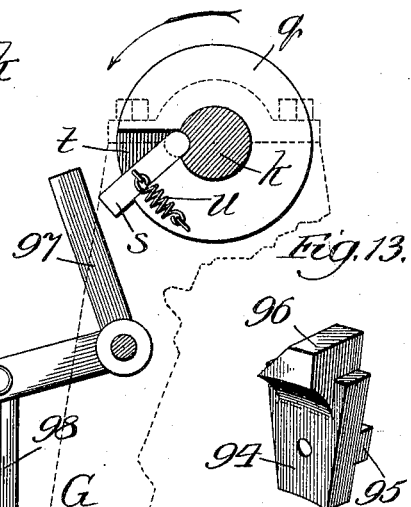
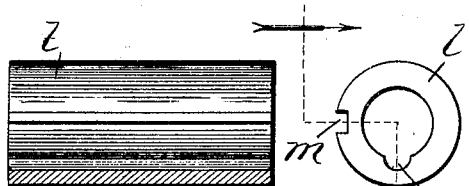
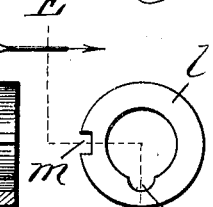
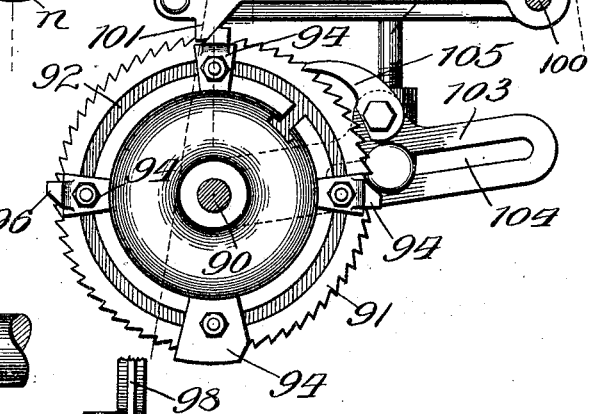
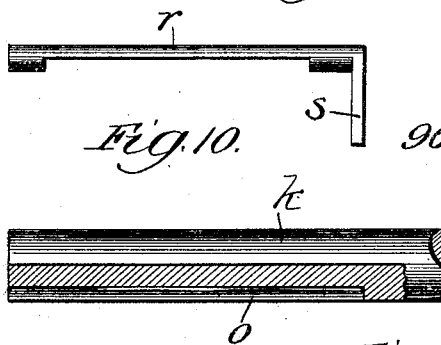
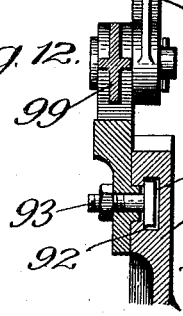
Witnesses:
Inventor:
Ellsworth E. Flora,
By Dyrenforth, Dyrenforth & Lee,
Attys.

No. 775,622. PATENTED NOV. 22, 1904.
E. E. FLORA.
MACHINE FOR MAKING BOX BLANKS.
APPLICATION FILED APR. 7, 1904.
NO MODEL. 12 SHEETS—SHEET 7.
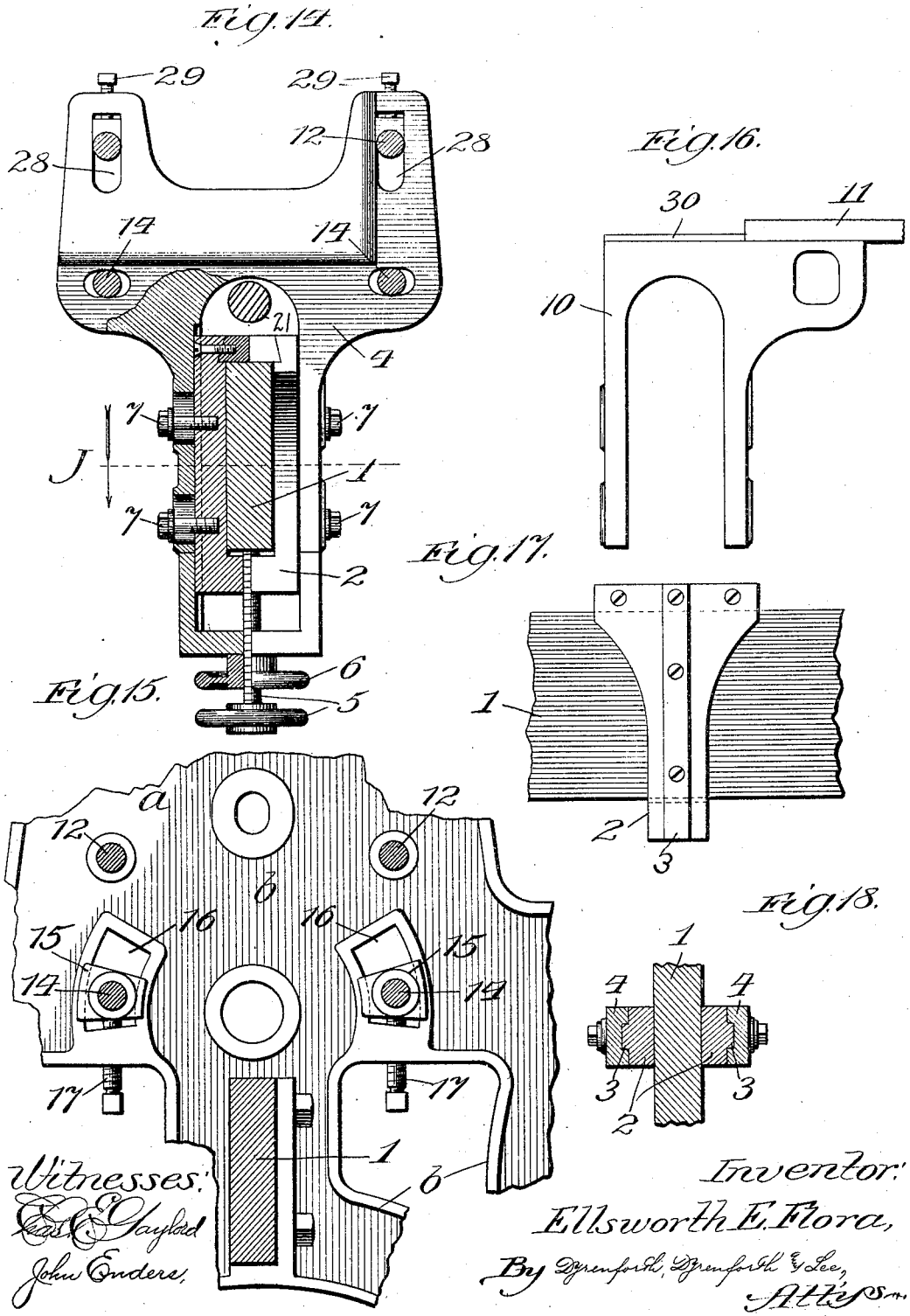
Witnesses:
Chas. E. Gaylord
John Enders
Inventor:
Ellsworth E. Flora,
By Dyrenforth, Dyrenforth & Lee,
Attys.

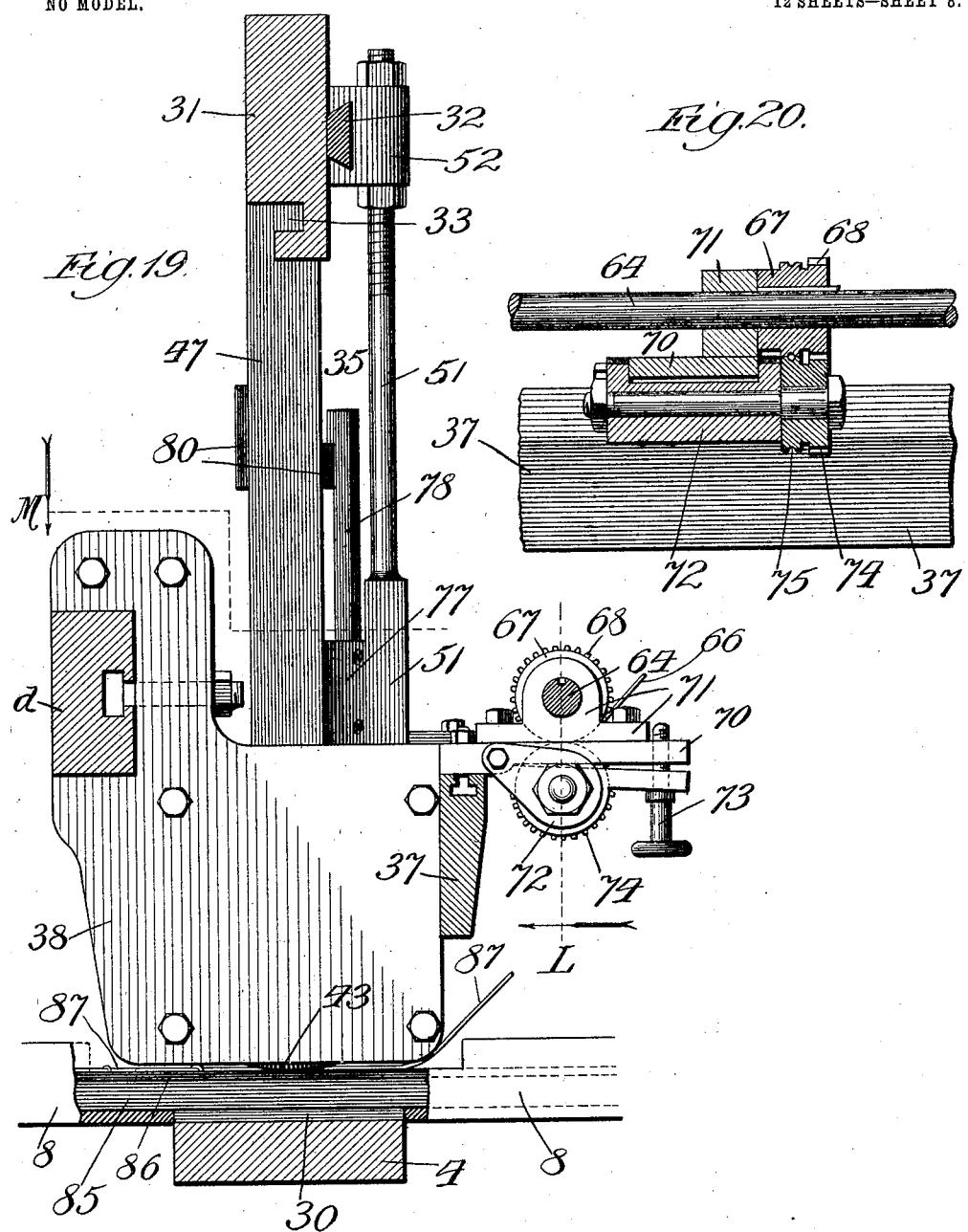

No. 775,622. PATENTED NOV. 22, 1904.
E. E. FLORA.
MACHINE FOR MAKING BOX BLANKS.
APPLICATION FILED APR. 7, 1904.
NO MODEL. 12 SHEETS—SHEET 9.
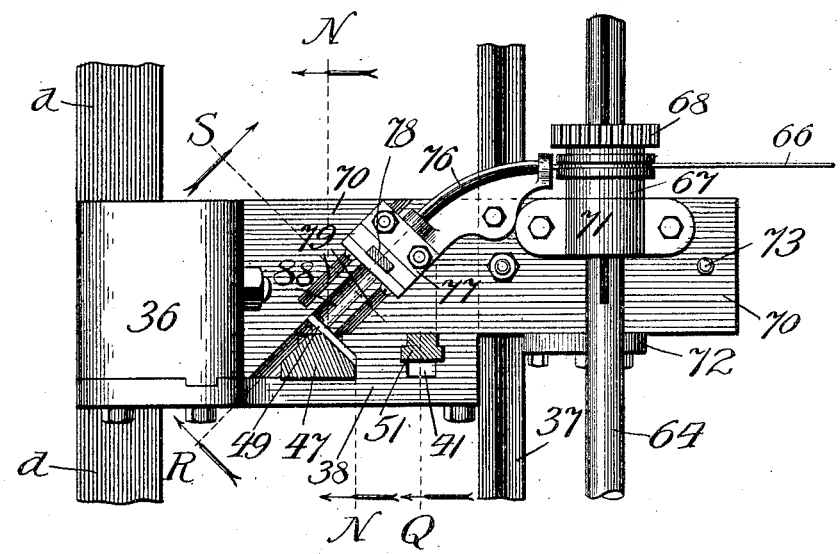
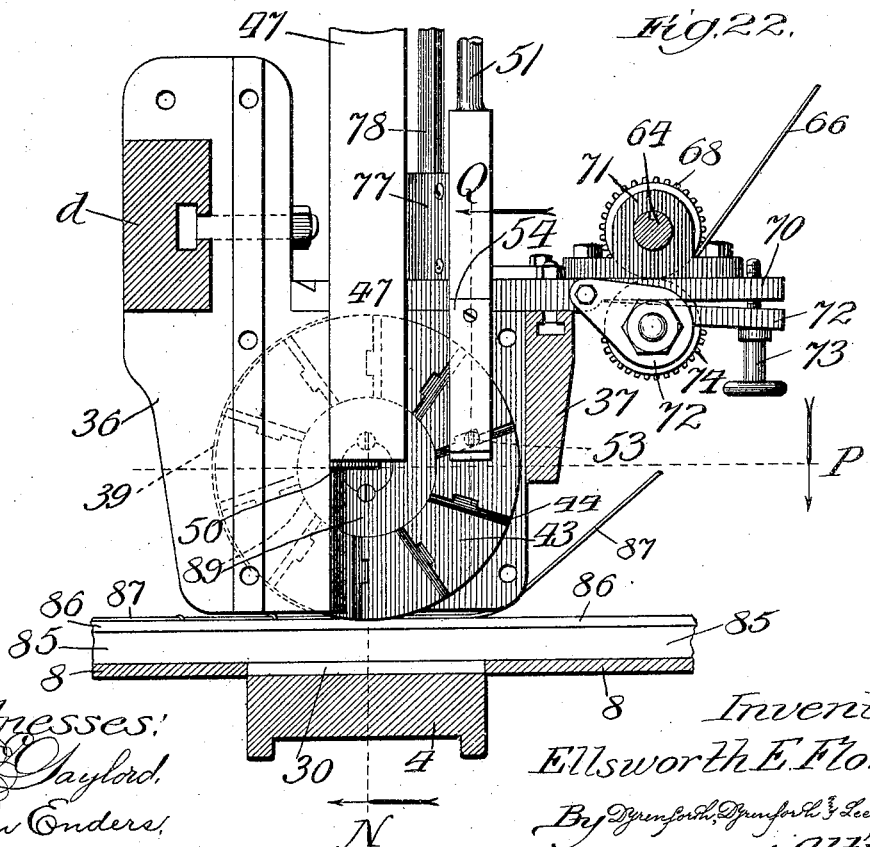

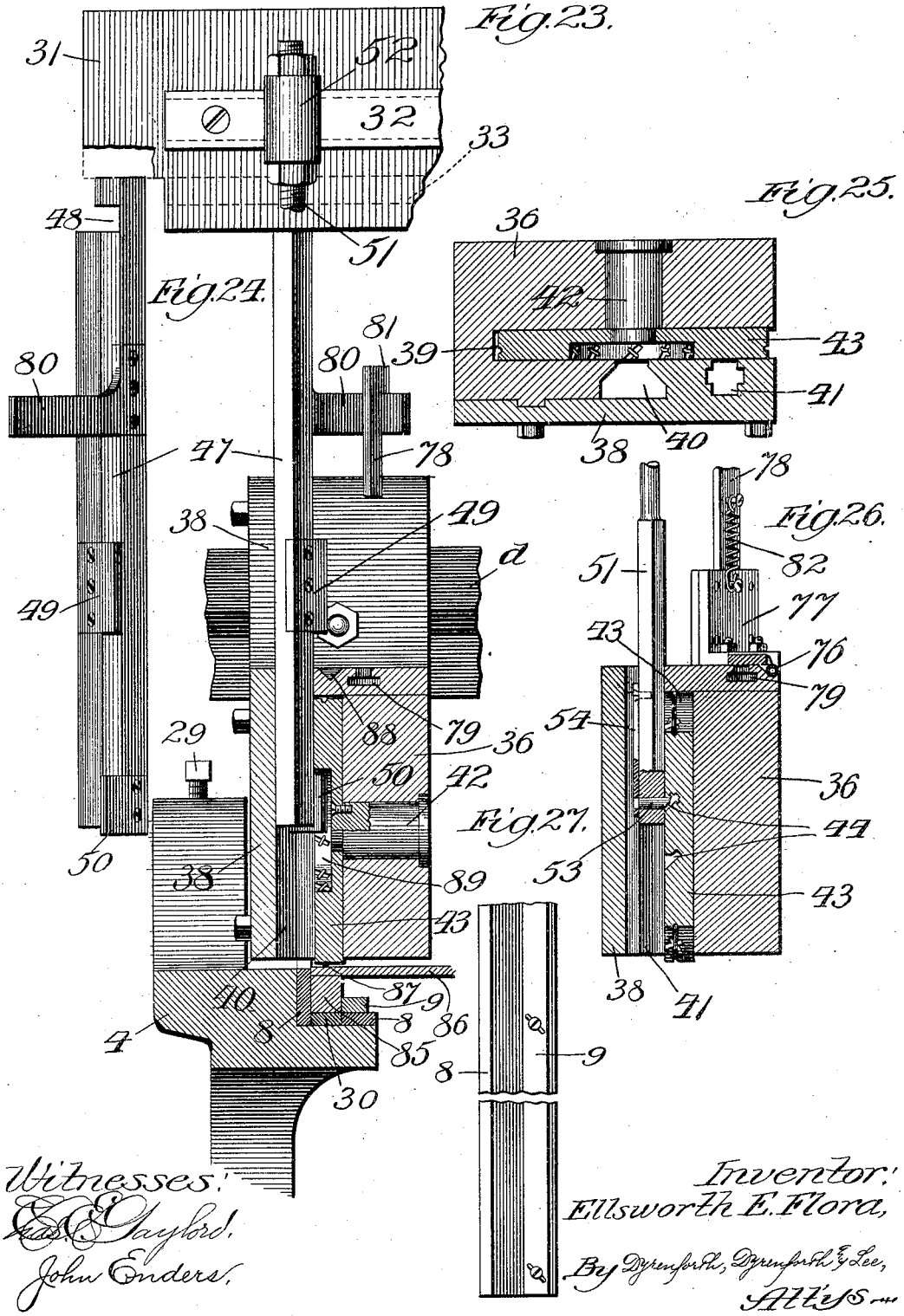

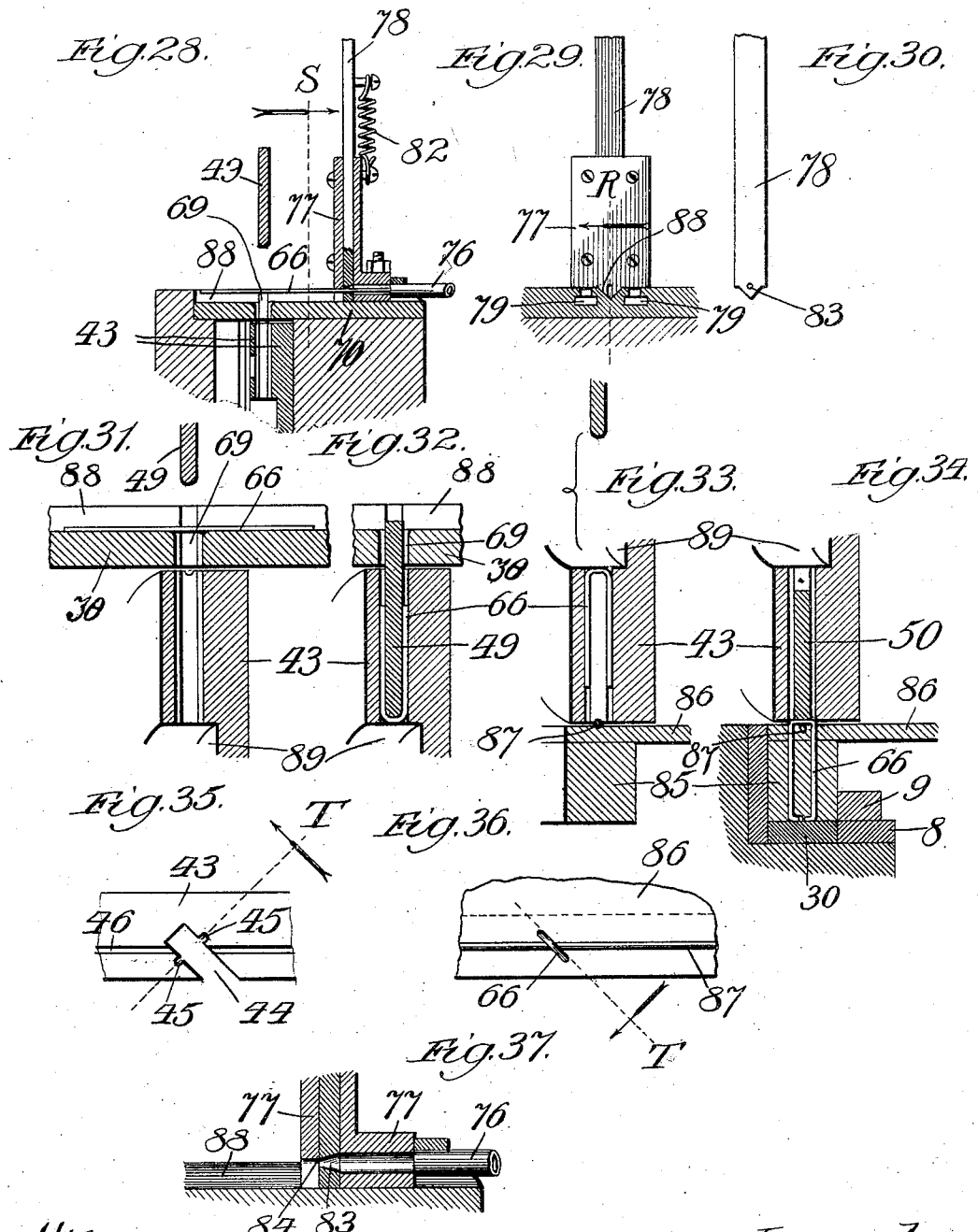

No. 775,622. PATENTED NOV. 22, 1904.
E. E. FLORA.
MACHINE FOR MAKING BOX BLANKS.
APPLICATION FILED APR. 7, 1904.
NO MODEL. 12 SHEETS—SHEET 12.
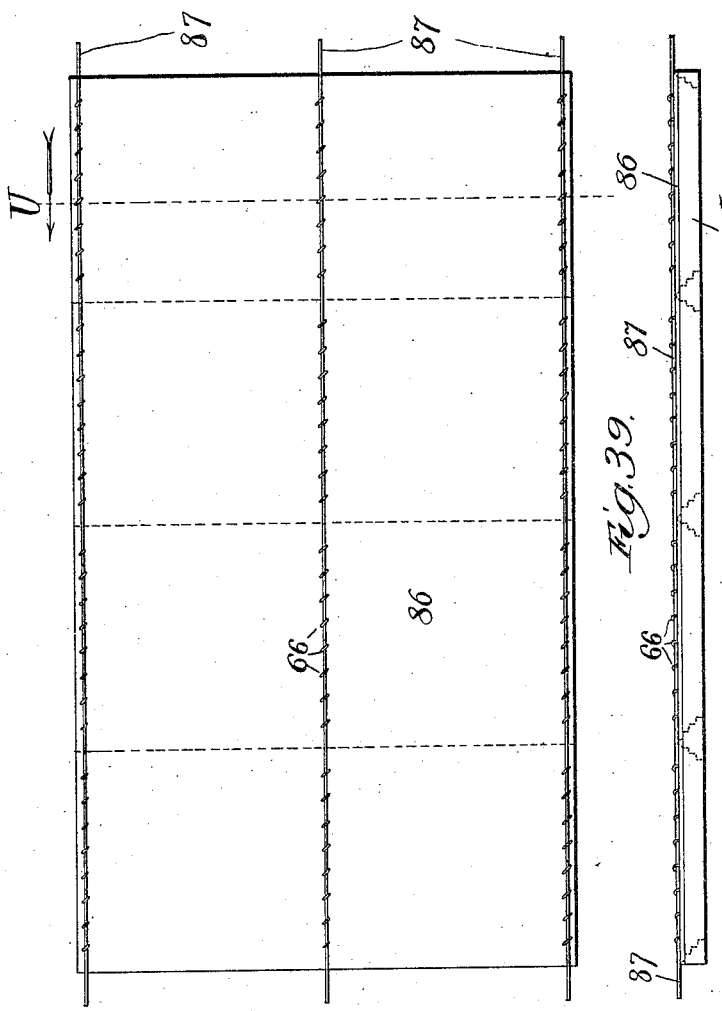

No. 775,622.                                            Patented November 22, 1904.

UNITED STATES PATENT OFFICE.

ELLSWORTH E. FLORA, OF CHICAGO, ILLINOIS, ASSIGNOR TO WILLIAM P. HEALY, OF CHICAGO, ILLINOIS.

MACHINE FOR MAKING BOX-BLANKS.

SPECIFICATION forming part of Letters Patent No. 775,622, dated November 22, 1904.

Application filed April 7, 1904. Serial No. 202,083. (No model.)

*To all whom it may concern:*

Be it known that I, ELLSWORTH E. FLORA, a citizen of the United States, residing at Chicago, in the county of Cook and State of Illinois, have invented a new and useful Improvement in Machines for Making Box-Blanks, of which the following is a specification.

This invention relates to an improvement in machines for making box-blanks of the general type shown in Figures 38, 39, and 40 of the drawings. The blank consists of a sheet of thin wood or the like in one or more sections and provided on one side toward opposite edges with longitudinally-extending reinforcing cleats. In the case of a very large box-blank one or more additional cleats may be provided between the edge cleats. Coincident with the cleats on the opposite side of the blank are binding-wires fastened in place with staples or the like, which staples straddle the wires and pass through the sheet into the cleats. When only the edge cleats are employed, the box-blank may have one or more intermediate strengthening-wires fastened to the sheet only by staples, as indicated in Fig. 40. It may be here stated that when the blank has been formed in the present machine it is passed through a step-mitering machine, which forms step-miters in the cleats and a groove in the sheet, as indicated by dotted lines in Fig. 39, at which step-miters the blank may be folded to form four sides of what is known in the trade, as a "wire-bound box," the projecting ends of the binding-wires being twisted together to hold the opposite edges of the blank together. The box is completed by fastening box ends to the end cleats.

In the present machine the wooden strips which are to form the cleats are placed in guides upon the feeding-bed of the machine and the first section of the sheet placed thereon. The machine in runing causes the sheet and cleats to be fed forward beneath simultaneously fed binding-wires, which latter are stapled in place, the staples also operating to fasten the sheet to the cleats. At those points along the blank where the step-miter cuts are to be made the machine operates to feed the blank without driving staples, in order that there shall be no staples in the blank in the way of the step-mitering knives or saws.

My object is to provide a generally improved machine for making box-blanks of the character described which shall be of a particularly simple, durable, and economical construction, involving comparatively few parts and well adapted for its purpose.

Figure 2:
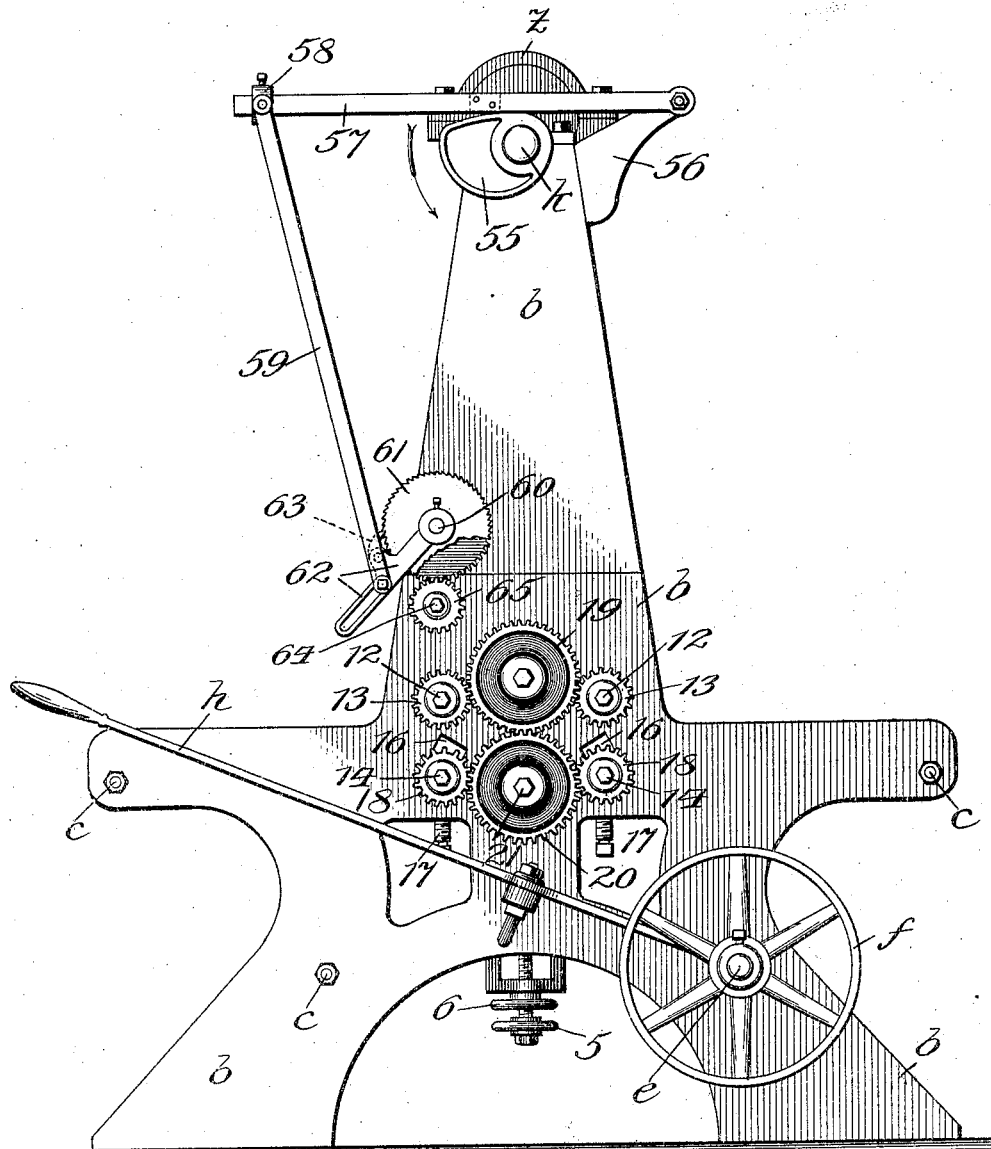
Figure 3:
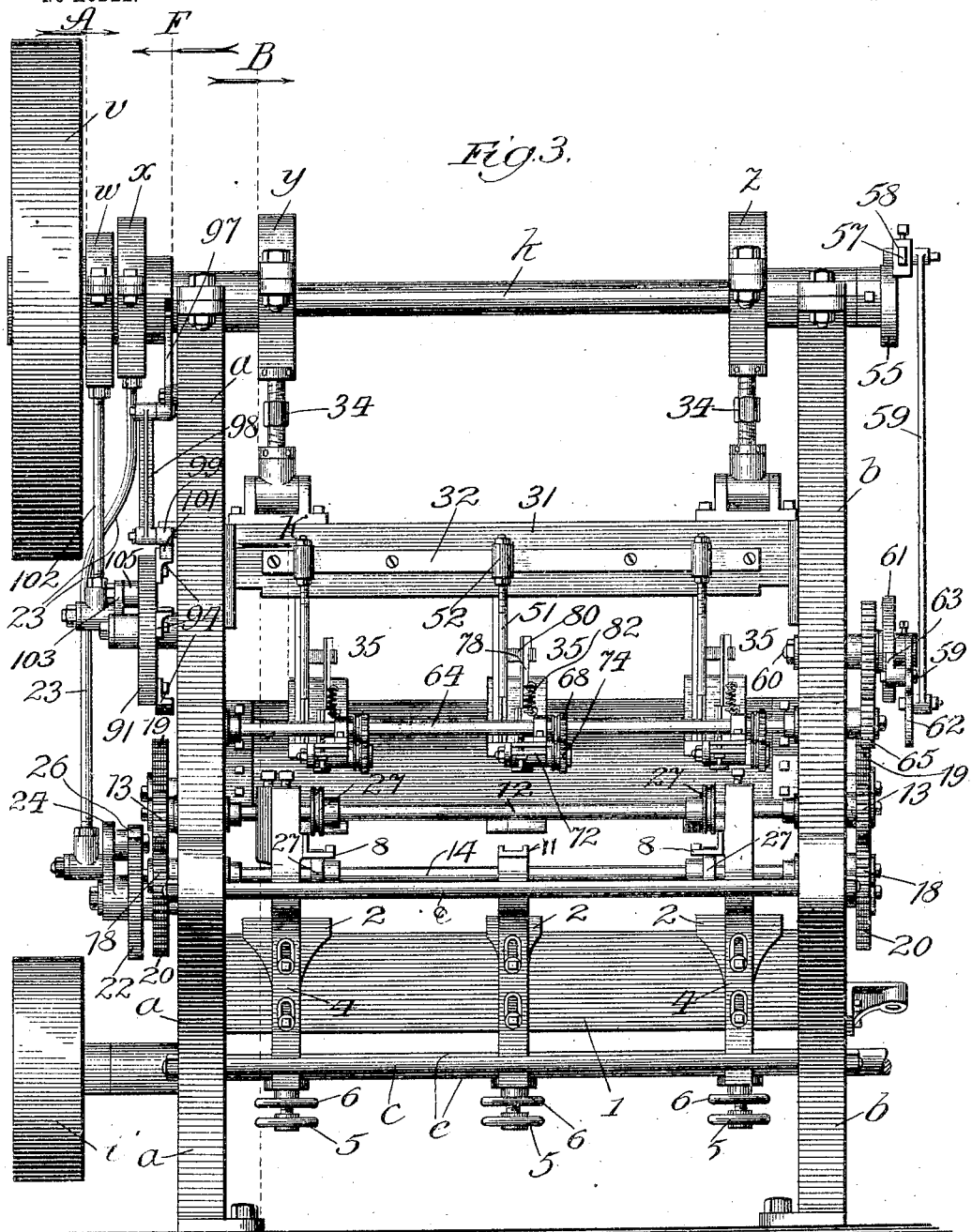
Figure 4:
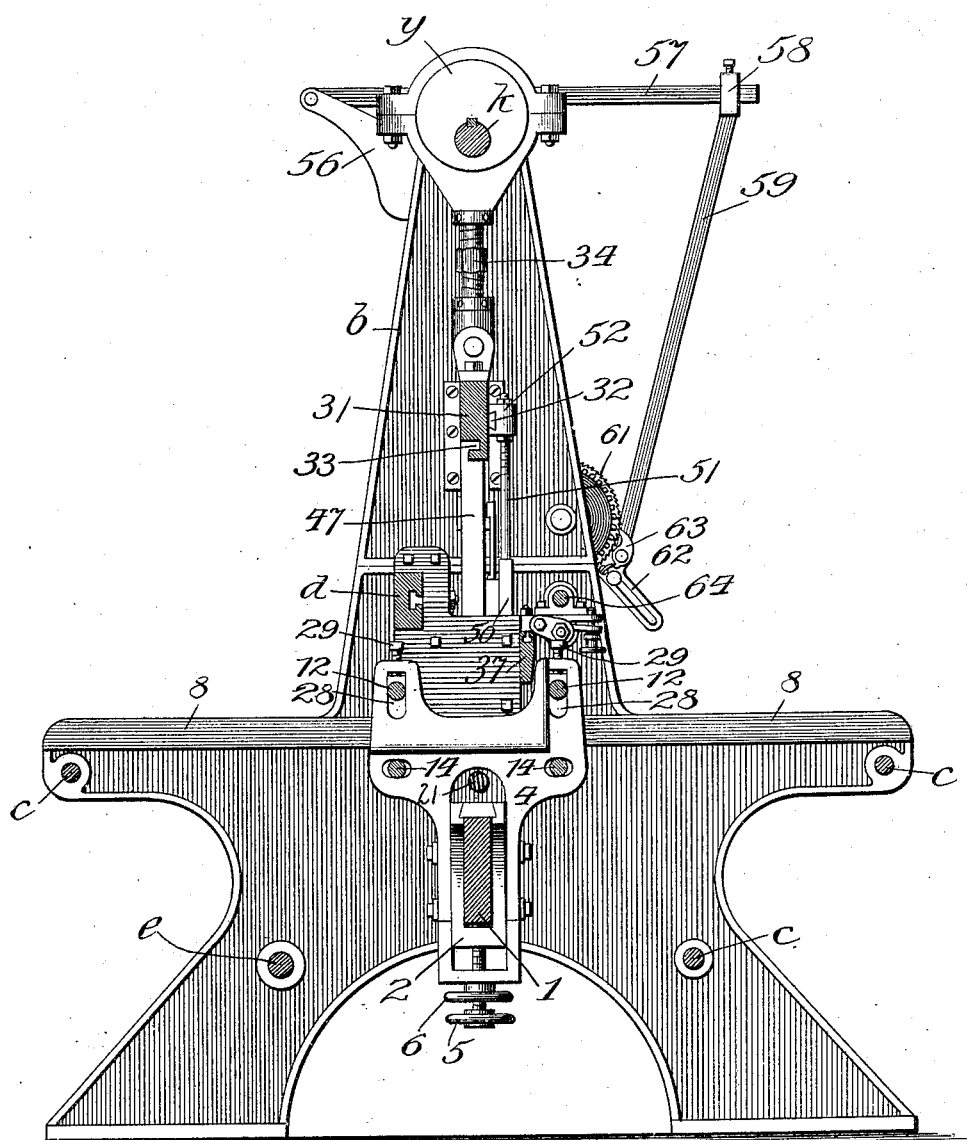
Figure 5:
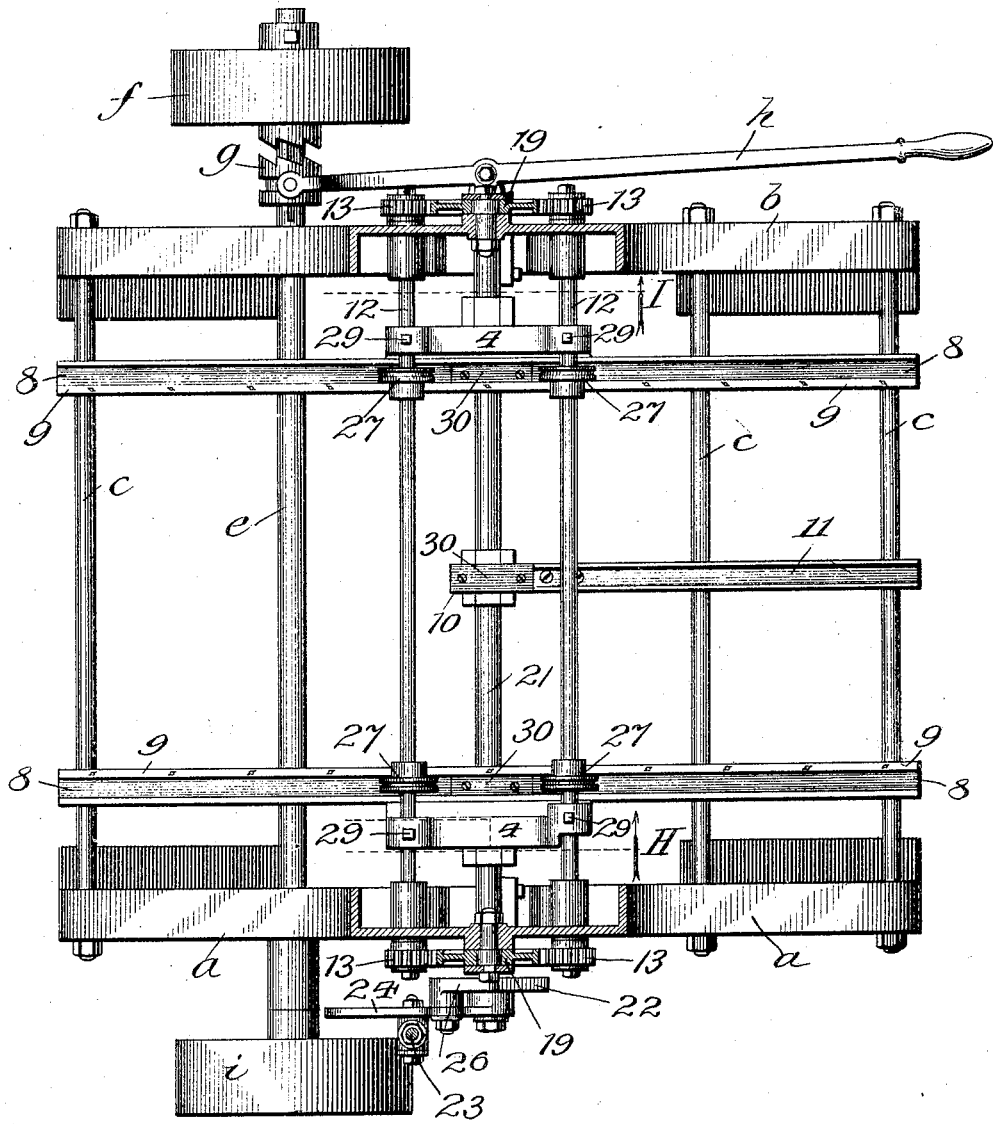

Referring to the drawings, Figure 1 is a partly sectional side elevation of the machine, the section being taken on line A in Fig. 3; Fig. 2, an elevation of the opposite side of the machine; Fig. 3, a front elevation; Fig. 4, a section on line B in Fig. 3; Fig. 5, a plan section taken on line C in Fig. 1; Fig. 6, an enlarged broken section taken on line D in Fig. 1, showing the clutch mechanism for the upper shaft; Fig. 7, a section taken on line E in Fig. 8, Fig. 8, an end view of a clutch-sleeve, shown in Fig. 6; Fig. 9, a view in elevation of a rock-shaft detail of the clutch mechanism shown in Fig. 6; Fig. 10, a broken sectional view of one end portion of the upper shaft; Fig. 11, a broken sectional elevation of clutch mechanism and means for actuating the same at the proper time for preventing the driving of staples, the section being taken on line F in Figs. 3 and 6; Fig. 12, a broken section on line G in Fig. 11; Fig. 13, an enlarged perspective view of one of the adjustable skipper or spacing blocks shown in Fig. 11; Fig. 14, an enlarged section on line H in Fig. 5; Fig. 15, an enlarged broken section on line I in Fig. 5; Fig. 16, a side elevation of an adjustable central saddle; Fig. 17, a broken view showing one of the saddle supports or yokes; Fig. 18, a broken section taken on line J in Fig. 14; Fig. 19, an enlarged broken section taken on line K in Fig. 3, showing a staple former and driver and staple-wire feeder; Fig. 20, a broken section on line L in Fig. 19, showing the staple-wire feed-rolls; Fig. 21, a broken plan section on the irregular line M in Fig. 19; Fig. 22, a view taken on line K in Fig. 3, the same as Fig. 19, but with the face-plate shown in Fig. 19 removed; Fig. 23, a section on irregular line N N in Figs. 21 and 22, showing one of the staple formers and drivers; Fig. 24, one of the staple forming and driving bars; Fig. 25, a section on line P in Fig. 22; Fig. 26, a section on line Q in Figs. 21 and 22, showing the staple-wheel-turning mechanism; Fig. 27, a broken plan view of the forward part of one of the cleat-guides, showing the means for adjusting the guide-strip thereon; Fig. 28, a section on line R in Fig. 21 through one of the staple-wire and staple-forming mechanisms; Fig. 29, a section no line S in Figs. 21 and 28, showing the face of the staple wire-cutter; Fig. 30, a broken view in elevation of a movable staple-wire cutter-bar; Figs. 31, 32, 33, and 34, sections taken on lines T in Figs. 35 and 36 and showing the steps in the operation of forming and driving a staple; Fig. 35, a broken edge view of one of the staple-wheels; Fig. 36, a broken section of the box-blank, showing, by a sufficiently large view, the way the staple is driven over the binding-wire to avoid splitting the wood; Fig. 37, an enlarged section taken on line R in Figs. 21 and 29, the view showing some of the parts also shown in Fig. 28; Fig. 38, a plan view of the completed box-blank; Fig. 39, an edge view of the same, showing step-miter cuts in dotted lines; and Fig. 40, a section on line U in Fig. 38.

The main frame of the machine consists of the side cheeks $a$ $b$, fastened together by means of tie-rods $c$ and cross-bars $d$ and 37. The machine is driven by power applied to a main drive-shaft $e$ in the lower part of the frame. The shaft receives its power at a pulley $f$, Figs. 2 and 5, which is loose upon the shaft, but may be locked thereto by a sliding clutch $g$, actuated from the pivotal lever $h$. On the end of the shaft $e$ opposite the pulley $f$ is a pulley $i$. Journaled in the upper ends of the cheeks is a shaft $k$. On the end portion of the shaft $k$ (see Figs. 6 to 11, inclusive) is a sleeve $l$, provided in its outer face with a longitudinally-extending keyway $m$ and on its inner face with a semicircular groove $n$. In the shaft within the sleeve is a semicircular groove $o$. On the shaft at opposite ends of the sleeve $l$ are collars $p$ and $q$, provided with bearing-openings for a rock-shaft $r$, which is cylindrical at opposite ends and semicircular between its ends. On the inner end of the rock-shaft $r$ is a crank-arm $s$, projecting through a flaring slot $t$ in the collar $q$. A spring $u$ tends to hold the rock-shaft $r$ in a position wherein its semicircular intervening part extends into the groove $n$ of the sleeve, thus clutching the sleeve and shaft together. It will be understood that when the crank $s$ is turned from the position shown in Fig. 11 to the top of the slot $t$ it rocks the shaft $r$ to disengage the shaft $k$ from the sleeve $l$, whereby the shaft will remain stationary while the sleeve rotates. On the sleeve $l$ is a pulley $v$, which in operation is belted to the pulley $i$ to be driven thereby. Also on the sleeve $l$ are eccentrics $w$ $x$, which are driven by rotation of the sleeve. On the shaft $k$ between the cheeks are eccentrics $y$ $z$.

Extending across the frame in the position shown is a bar 1, fastened at its ends by means of bolts to the cheeks $a$ $b$. Toward opposite ends of the bar 1 near the cheeks are sliding yokes 2 2, provided on opposite sides with feathers 3 3. (See Fig. 18.) Fitting over the yokes to slide vertically thereon are saddle-frames 4 4. (See Fig. 14.) Extending through a threaded opening in each yoke 2 is a screw 5, which at its upper end bears against the under side of the bar 1 to clamp the yoke in adjusted position. The screw 5 passes loosely through an opening in the lower end of the respective saddle 4, and on the screw beneath the saddle is a nut 6, which may be turned to slide the saddles vertically upon the yokes. Extending through elongated openings in the saddles at opposite sides are clamp-screws 7, tapped into the yokes, whereby the saddles may be fastened in adjusted position, and thus take a large part of the downward strain from the screws 5. Fastened to the saddles 4 to be raised and lowered therewith are cleat-guides 8. (See, for example, Figs. 23, 27.) The cleat-guides 8 are L-shaped in cross-section and are provided at their inner edges with the laterally-adjustable guide-strips 9. On the bar 1, toward the center thereof, is a yoke 2, constructed like the yokes described, though somewhat narrower, over which fits a vertically-adjustable saddle 10, constructed as shown in Fig. 16. Extending from the saddle 10 in the forward direction is an intermediate cleat-guide 11, which may be employed when an intermediate cleat is to be fastened to the box-blank. The saddle 10 and cleat-guide 11 may be raised and lowered upon the central yoke 2 in the same manner as the end saddles.

12 12 are upper feed-shafts journaled at opposite ends in the cheeks $a$ $b$ and provided beyond the said cheeks with pinions 13. 14 14 are lower feed-shafts journaled near opposite ends in boxes 15 15 in the cheeks $a$ $b$. The boxes 15 slide in openings 16 in the cheeks and rest on set-screws 17, whereby they may be adjusted in the vertical plane. On opposite ends of the shafts 14 are pinions 18. On the cheeks $a$ and $b$ between the pinions 13 are idle gear-wheels 19, and also upon the cheeks between the pinions 14 are gear-wheels 20, fixed upon a shaft 21, journaled in bearing-openings in the cheeks between the openings 16. The gears 19 and 20 mesh with each other and with the pinions 13 and 18, as shown, at each of the cheeks $a$ $b$. On the shaft 21 beyond the cheek $a$ is a ratchet-wheel 22. Extending downward from the eccentric $x$ is a rod 23, and fulcrumed at its end on the shaft 21 is a pawl-lever 24, having an elongated slot 25, to which the lower end of the rod 23 is adjustably fastened. The lever 24 carries a pawl 26, engaging the ratchet 22. On the upper and lower feed-shafts are laterally-adjustable feed-rollers 27, those on the upper shaft being grooved to pass over the binding-wires, as hereinafter described.

From the foregoing description it will be understood that by raising and lowering the end saddles 4 and also the intermediate saddle 10 the cleat-guides may be raised and lowered with relation to the upper feed-shafts 12, thus raising and lowering the lower feed-shafts, whereby cleats and sheets of different thicknesses may be employed and properly fed through the machine. The set-screws 17 and 7 are loosened before such adjustment is made and tightened after such adjustment. The upper feed-shafts 12 pass through bearing-openings 28 in the end saddles, and in the said bearing-openings are bearing-blocks for the upper sides of the shafts adjusted by set-screws 29. The object of the set-screws 29 and bearing-blocks in the openings 28 of the saddles is to prevent springing of the shafts 12 while blanks are passing through the machine, particularly when the saddles are adjusted some distance inward from the cheeks. Set into openings in the cleat-guides at the saddles are anvil blocks or plates 30 for clenching the staples, as hereinafter described.

Sliding in guides on the cheeks $a\ b$ is a vercally-reciprocating cross-head 31, provided on one side with a dovetailed rib 32, and provided on its opposite side at the lower edge with a groove 33, Fig. 19. The cross-head 31 is connected with the eccentrics $y\ z$ by adjustable connecting-rods 34. The connecting-rods 34 are rendered adjustable as to length in a common manner to regulate the throw of the cross-head.

In the machine, as shown, there are provided three staple forming and driving devices 35. As these devices are all constructed alike, it will only be necessary to describe in detail the construction of one. 36 is a block or frame mounted and laterally adjustable upon the bar $d$ and also resting upon a stationary bar 37, extending across the machine. Fastened against the block 36 is a face-plate 38. In the block is a circular recess 39. The block and face-plate form between them a vertical guide-opening 40, and the face-plate is formed with a vertical guide-opening 41, all as shown in Figs. 22 and 25. Journaled upon a shaft 42 and rotating in the recess 39 is a staple-wheel 43. The staple-wheel is provided in one face with a series of radial slots 44 at an angle to the face of the wheel, as shown most plainly in Figs. 22 and 35. In the slots 44 on opposite sides are staple-guiding grooves 45. Extending around the periphery of the staple-wheel 43 is a groove 46 to override the binding-wire passing beneath it, as hereinafter described. 47 is a vertically-reciprocating bar provided at its upper end with a recess 48, forming a hook to engage and slide laterally in the recess 33 in the cross-head 31. On the bar 47 in the position shown is a laterally-projecting staple former or bender 49, and at the lower end of the bar is a laterally-projecting staple-driver 50. 51 is a rod threaded at its upper end to pass through a block 52, which is mounted upon the dovetailed strip 32, carried by the cross-head 31 to slide thereon for purposes of adjustment. The rod 51 may be raised and lowered in the block 52 for purposes of adjustment. The lower end of the rod 51 is T-shaped in cross-section, as shown in Fig. 21, to fit and slide vertically in the guide-opening 41. On the lower end portion of the rod 51, Fig. 26, is a latch or plunger 53, carried by a spring 54, which is fastened against the rod 51. The latch 53 is adapted to engage with the radial slots 44 in the staple-wheel to turn the latter in the rise of the cross-head 31, as hereinafter described. On the end of the shaft $k$ is a cam 55. On the upper end of the cheek $b$ is a bracket 56, upon which is fulcrumed a lever 57 in the path of the cam 55. On the lever 57 is an adjustable sliding block 58, with which is pivotally connected a connecting-rod 59. On the cheek $b$ is a stub-shaft 60, on which is journaled an integral ratchet and gear wheel 61. Fulcrumed on the stub-shaft 60 is a pawl-lever 62, provided with an elongated slot at which the lever is connected with the connecting-rod 59. The lever 62 carries a pawl 63, engaging the ratchet 61. 64 is a shaft journaled toward opposite ends in the cheeks $a\ b$ and provided beyond the cheek $b$ with a pinion 65, meshing with the gear-wheel on the stub-shaft 60.

The wire 66 from which the staples are to be formed may be provided upon spools mounted in any convenient way, as indicated in Fig. 1. On the shaft 64 are wheels 67 presenting the gears 68 and peripheral wire-engaging grooves, as shown in Fig. 20. On each block 36 is a plate 70, having a grooved staple-forming opening 69, and in the intermittent turning movements of the staple-wheel 43 the staple-receiving slots 44 are carried successively into register with the under side of the opening 69. On each plate 70 is a journal-bearing 71, surrounding the shaft 64. On the under side of the plate 70 of each staple forming and driving device is a pivotal jaw 72, adjustable to raise and lower by means of the screw 73, Fig. 22. The jaw 72 forms a bearing for a roller 74, having teeth forming a pinion and a peripheral groove 75 registering with the peripheral groove in the wheel 67 for engaging the staple-wire. Mounted upon the plate 70 is a wire-guiding tube 76 terminating at an adjustable head 77. The head 77 forms a vertical guide for a vertically-movable cutter-bar 78. The head 77 is bolted to the plate 70 in T-grooves 79, (shown in Fig. 29,) the T-grooves extending diagonally along the plate, as shown in Fig. 21. This permits the adjustment of the head to cut the wire for different length staples. On the bar 47 is a laterally-extending arm 80, and the cutter-bar 78 has an offset 81, which extends over the path of the arm 80. The cutter-bar is held normally down by a spring 82, as shown in Figs. 26 and 28. In the lower end portion of the cutter-bar is a flaring opening 83, (see Figs. 30 and 37,) and the said opening moves past a cutting edge 84 in the head 77.

The operation of the machine thus far described is as follows: The wooden cleats 85 are placed in the cleat-guides 8, and the first section of the sheet 86 (if in more than one section) placed thereon. The ends of the cleats and forward edge of the sheet-section should be pressed into the bite of the upper and lower feed-rolls 27. The machine may be started by turning the lever $h$ to operate the clutch $g$, when the shafts will be caused to rotate. The rotation of the shaft $k$ reciprocates the rod 23 and causes it to move the pawl 26 to turn the upper and lower feed-shafts intermittingly. This turning of the shafts feeds the cleats and sheet along beneath the staple forming and driving devices 35. Before starting the machine strengthening-wires 87 are passed at their ends beneath the grooves in the staple-wheels 43. In the rise and fall of the cross-head 31 staples are formed and driven, the operation being as follows: In each rotation of the shaft $k$ the cam 55 raises the lever 57 and connecting-rod 59 to turn the ratchet and gear wheel 61 to rotate the pinion 65 and shaft 64. In the rotation of the shaft 64 the wheels 67 and 74 are rotated to feed the staple-wire 66 through the tube 76 and head 77 beneath the cutting edge 84 and along a V-shaped groove 88 in the plate 70, which is bisected by the opening 69. In the upward movement of the cross-head, following this operation, the bar 47 of each staple forming and driving device is raised to raise the cutter-bar 78 against the resistance of the spring 82 and shear off the wire at the edge 84. At the time that the wire is severed it extends in the groove 88 across the forming-opening 69 in the plate 70 over the staple-wheel 43. The slot 44 of the staple-wheel, which then extends uppermost, registers in position to receive the staple-forming arm 49 as it passes downward through the opening 69. In the downward movement of the cross-head the staple-forming arm or projection 49 moves from the position shown in Fig. 31 to the position shown in Fig. 32, wherein it bends the severed staple-wire 66 downward into the grooves 45 of the then upper vertical slot 44, as shown in Fig. 32. In the next upper movement of the cross-head the latch 53 engages a groove 44 and turns the staple-wheel until the next groove is in the vertical position. As will be seen by reference to Fig. 22, there are ten grooves 44 in the staple-wheel, and although this particular number is not necessary they should be in even numbers, whereby the wheel will always present two vertical grooves 44, one above and one below a central recess 89 in said wheel 43. When the bar 47 is in its raised position, the driving arm or projection 50 is in the wheel-recess 89, so that the turning of the wheel is not obstructed thereby. After a staple has been formed as described, it remains in the staple-wheel during a one-half revolution thereof. In the downward movement of the bar 47 the driving projection 50 moves into and through the then lowest vertical groove 44 and engaging the top of the staple, (shown in Fig. 33,) drives it downward over the binding-wire 87 and through the sheet 86 and cleat 85 against the anvil or clenching-block 30. The driving of one staple is performed while another staple is being formed, as described. Thus as the blank is being fed along with the strengthening-wires staples are formed and driven at suitable intervals, as described.

As before stated, no staples are to be driven into the blanks at the points where step-miter cuts are to be made. Therefore at the points where those cuts are to be made the driving of staples is withheld while the blank is fed along. This operation is brought about in the following manner and by the following mechanism: On the cheek $a$ is a stub-shaft 90, upon which is journaled a skipper-wheel 91 in the form of a ratchet-wheel, provided in one side with an annular T-groove 92, Figs. 11 and 12. The T-groove 92 receives the heads of bolts 93, carrying spacing skipper-blocks 94—three of one length and one of greater length, as shown in Fig. 11. The blocks 94 have tongues 95, which fit the T-groove 92 and have beveled heads 96, as shown. By loosening the nuts on the bolts 93 the skipper-blocks may be moved to any desired position on the ratchet 91. Extending into the path of the crank $s$ of the rock-shaft $r$, carried by the shaft $k$, is one arm of a swinging bell-crank lever 97. Extending from the other arm of the bell-crank lever is a pivotal rod 98, pivotally connected at its lower end with a lever 99, fulcrumed at 100 on the cheek $a$. On the lever 99 is a beveled lip 101 in the path of the skipper-blocks 94. Extending downward from the eccentric $w$ is a connecting-rod 102, pivotally connected at its lower end with a lever 103 at an elongated slot 104 in the latter. The lever is fulcrumed upon the stub-shaft 90 and carries a pawl 105, engaging the ratchet 91. In each rotation of the shaft $k$ the ratchet 91 is turned by the pawl 105 to advance the skipper-blocks intermittingly. When a skipper-block engages the lip 101, it raises the lever 99 and turns the bell-crank lever 97 into the path of the crank s. This causes the crank s in the rotation of the sleeve l and shaft k to be rocked and disengage the shaft k and sleeve l, whereby the shaft k is caused to stop while the sleeve rotates. During the time that the said shaft ceases to rotate the cross-head 31 will remain quiescent and no staple-wire will be fed or staples formed or driven. When the respective skipper-block has passed beyond and releases the lip 101, the bell-crank lever 97 is swung out of the path of the crank s, permitting the latter to be turned by the spring u to clutch the sleeve and shaft, whereby the shaft is once more driven.

As the machine is illustrated in the drawings, the parts are adjusted to turn out box-blanks of the greatest length and width within the capacity of the machine, and the skipper blocks or spacers, as shown in Fig. 11, are adjusted for blanks intended when folded to form the sides of a box square in cross-section. Each of the three shorter blocks 94 operate to stop rotation of the shaft k during a single revolution of the sleeve l and drive-pulley v, whereby at the respective points along the blank the machine skips—that is to say, fails to drive—one staple over each binding-wire. The longer block 94 may be about three times the length of the shorter blocks and operates to stop the shaft k as the blank ends pass across the staple-drivers. As a blank passes out of the machine an operator snips the binding-wires, and, owing to the skipping of staples, binding-wire ends are left long enough to insure proper fastening of the sides when the blank is folded to form a box. The smaller skipper-blocks 94 may be adjusted to any position along the groove 92 with reference to themselves and the longer block 94, so that boxes oblong, as well as square, in cross-section may be formed.

In machines of this class as hitherto provided the staple forming and driving mechanisms have been of such complicated construction that they have been hard to keep in running order. The present staple forming and driving mechanism is particularly simple and certain in its operation. The staples are formed in the forming-openings 69 in the top plate 70, and there is no strain or jar on the staple-wheel 43, which merely presents guide-slots 45, into which the staples are slipped when formed and out of which they are thrust when driven. By gearing all the upper and lower feed-rollers together at opposite ends, as shown and described, the blank material is firmly gripped from above and below and fed along without danger of any slip which would tend to disarrange the staples. The distance of feed with each rotation of the pulley v and consequent spacing apart of the staples in the blank may be regulated by adjusting the rod 23 along the slot 25 of the pawl-lever 24, which adjusts the throw of the pawl. The skipper mechanism may be changed for blanks of different lengths by adjusting the rod 102 along the slotted lever 103 to cause the ratchet-wheel 91 to rotate exactly once in the passage of the blank across the staple-drivers.

The feeding mechanism for the staple-wire has a double regulation for regulating the length of the staples. This is effected by moving the upper end of the rod 59 along the lever 57 and moving the lower end of the rod 59 along the lever 62. Such double regulation is necessary for a sufficiently wide range of fine adjustment in the length of the finished staples.

The regular feeding of the staple-wires is controlled by the upper and lower grooved feed-rollers 67 and 74, the lower ones being movable to regulate the grip upon or entirely release the wire. Thus wires of different gage may be employed for the staples. In the event that the central part of the blank is not to be provided with a binding-wire and no staples are therefore to be driven there the middle stapling device may be thrown out of action by simply lowering its under feed-roller 74.

While I prefer to construct my improvements throughout as shown and described, they may obviously be variously modified in the matter of details of construction without departing from the spirit of the invention as set forth in the claims.

What I claim as new, and desire to secure by Letters Patent, is—

1. In a machine for forming box-blanks of the nature described, the combination with the drive-shaft, cleat-guides and stapling devices, of feed mechanism for the blank material comprising upper peripherally-grooved sheet-engaging rollers and lower cleat-engaging rollers, and driving-gears on all of said rollers actuated from the drive-shaft.

2. In a machine for forming box-blanks of the nature described, the combination with the drive-shaft, cleat-guides and stapling devices, of feed mechanism for the blank material comprising upper peripherally-grooved sheet-engaging rollers and lower cleat-engaging rollers, intermittent driving mechanism actuated from said drive-shaft, and driving-gears on all of said rollers connected with said intermittent driving mechanism.

3. In a machine for forming box-blanks of the nature described, the combination with the drive-shaft, cleat-guides and stapling devices, of feed mechanism for the blank material comprising upper peripherally-grooved sheet-engaging rollers and lower cleat-engaging rollers, all geared together and actuated from said drive-shaft.

4. In a machine for forming box-blanks of the nature described, the combination with the drive-shaft, cleat-guides and stapling devices, of feed mechanism for the blank material comprising upper peripherally-grooved sheet-engaging rollers and lower cleat-engaging rollers, all geared together at both their ends and actuated from said drive-shaft.

5. In a machine for forming box-blanks of the nature described, the combination with the drive-shaft, cleat-guides and stapling devices, of feed mechanism for the blank material comprising upper peripherally-grooved sheet-engaging rollers and lower cleat-engaging rollers, all geared together, and intermittent driving means for said rollers at one end, actuated from said drive-shaft.

6. In a machine for forming box-blanks of the nature described, the combination with the drive-shaft, cleat-guides and stapling devices, of feed mechanism for the blank material comprising upper peripherally-grooved sheet-engaging rollers and lower cleat-engaging rollers, the lower said rollers being journaled in vertically-adjustable bearings, and raising and lowering means for said bearings.

7. In a machine for forming box-blanks of the nature described, the combination with the laterally-adjustable staple-drivers, of a stationary bar beneath said drivers, yokes slidingly mounted on said bar, vertically-adjustable saddles on said yokes, and cleat-guides on the saddles.

8. In a machine for forming box-blanks of the nature described, the combination with the laterally-adjustable staple-drivers, of a stationary bar beneath said drivers, yokes slidingly mounted on said bar, vertically-adjustable saddles on said yokes, and cleat-guides and anvil-blocks on the saddles.

9. The combination with the upper shaft and staple-drivers actuated thereby, of means for feeding the box-blank material, a driving-pulley on the said shaft, clutch mechanism between said pulley and shaft, a skipper-wheel, intermittent rotating means for said wheel, spacing-blocks on said wheel, and disengaging mechanism for said clutch in the path of said spacing-blocks, substantially as and for the purpose set forth.

10. The combination with the upper shaft and staple-drivers actuated thereby, of means for feeding the box-blank material, a driving-pulley on the said shaft, clutch mechanism between said pulley and shaft, a skipper-wheel, adjustable intermittent rotating means for said wheel, spacing-blocks on said wheel, and disengaging mechanism for said clutch in the path of said spacing-blocks, substantially as and for the purpose set forth.

11. The combination with the upper shaft and staple-drivers actuated thereby, of means for feeding the box-blank material, a driving-pulley on the said shaft, clutch mechanism between said pulley and shaft, a skipper-wheel, intermittent rotating means for said wheel, adjustable spacing-blocks on said wheel, and disengaging mechanism for said clutch in the path of said spacing-blocks, substantially as and for the purpose set forth.

12. The combination with the upper shaft and staple-drivers actuated thereby, of means for feeding the box-blank material, a driving-pulley on the said shaft, clutch mechanism between said pulley and shaft, a skipper-wheel, intermittent rotating means for said wheel, one long spacing-block and three short spacing-blocks on said wheel, and disengaging mechanism for said clutch in the path of said spacing-blocks, substantially as and for the purpose set forth.

13. The combination with the blank-feeding mechanism, of a staple forming and driving device comprising a plate having a staple-forming opening, a wire-bender movable through said opening, means below said opening for receiving the staple, driving means for the staple, a head through which the staple-wire is fed adjustable toward and away from said opening, an intermittingly-actuated wire-cutter on said head, and intermittent-feed mechanism for the staple-wire.

14. The combination with the blank-feeding mechanism, of a staple-driving device comprising a plate having a staple-forming opening, a wire-bender movable through said opening, means below said opening for receiving the staple, driving means for the staple, a head through which the staple-wire passes adjustable toward and away from said opening, and feeding mechanism for the staple-wire comprising upper and lower feed-rollers adjustable with relation to each other to regulate the grip upon the wire or release the wire, substantially as set forth.

15. The combination with the blank-feeding mechanism, of a staple-driving device comprising a stationary plate having a staple-forming opening, means for feeding a wire across said opening, severing means for the wire, a staple-wheel provided with radial slots, intermittent rotating means for the wheel operating to turn the slots successively into register with said staple-forming opening, and a reciprocating bar provided with a wire-bending arm movable through said staple-forming opening and operating to form the staples and deposit them in said slots, and a driving-arm movable in said slots to discharge the staples, whereby in each reciprocation of the said rod one staple is formed and another staple is driven, substantially as and for the purpose set forth.

16. The combination with the blank-feeding mechanism, of a staple-driving device comprising a stationary plate having a staple-forming opening, a cutter-head, a vertically-reciprocating cutter-bar movable across said cutter-head to sever the wire in its upstroke, means for feeding the wire through said cutter-head and across said staple-forming opening, a staple-wheel provided with radial slots, intermittent rotating means for the wheel operating to turn the slots into register with said staple-forming opening and the staple-driving position, and a vertically-reciprocating bar having an arm, movable through said staple-forming opening to form the staples and deposit them in said wheel, a driving-arm, movable in the slots of said wheel to discharge the staples, and an arm in the path of said cutter-bar, operating in its upstroke to actuate the cutter, whereby in the downstroke of said vertically-reciprocating bar one staple is formed and another is driven and in its upstroke the blank for a third staple is formed, substantially as set forth.

ELLSWORTH E. FLORA.

In presence of—
WALTER N. WINBERG,
W. B. DAVIES.